US006805930B2

(12) United States Patent
Hanada et al.

(10) Patent No.: US 6,805,930 B2
(45) Date of Patent: Oct. 19, 2004

(54) THERMOPLASTIC RESIN SHEET AND CONTAINER

(75) Inventors: Satoshi Hanada, Ibaraki (JP); Mitsunori Nodono, Ibaraki (JP); Ryuma Kuroda, Ibaraki (JP)

(73) Assignee: Sumitomo Chemical Company, Ltd., Osaka (JP)

(*) Notice: Subject to any disclaimer, the term of this patent is extended or adjusted under 35 U.S.C. 154(b) by 451 days.

(21) Appl. No.: 09/820,757

(22) Filed: Mar. 30, 2001

(65) Prior Publication Data

US 2001/0036522 A1 Nov. 1, 2001

(30) Foreign Application Priority Data

Apr. 3, 2000 (JP) ........................................ 2000-100473
Apr. 3, 2000 (JP) ........................................ 2000-100474

(51) Int. Cl.[7] .................. B29D 22/00; B29D 23/00; B32B 1/08; B32B 3/26; B32B 3/00
(52) U.S. Cl. ................ 428/36.5; 428/36.92; 428/304.4; 428/316.6; 428/315.7; 428/315.5
(58) Field of Search ............................. 428/36.5, 304.4, 428/36.92, 316.6, 315.7, 315.5, 308.4, 317.1, 318.6, 319.7; 521/51

(56) References Cited

U.S. PATENT DOCUMENTS

| | | | | |
|---|---|---|---|---|
| 4,039,362 A | | 8/1977 | Ernstsson et al. ............. 156/69 |
| 4,154,785 A | * | 5/1979 | Inui et al. .................. 264/45.5 |
| 4,251,584 A | * | 2/1981 | van Engelen et al. ...... 428/159 |
| 4,522,675 A | | 6/1985 | Sharps, Jr. ............. 156/244.11 |
| 5,075,162 A | * | 12/1991 | Okubo et al. ............ 428/304.4 |
| 5,348,795 A | * | 9/1994 | Park ........................... 428/220 |
| 5,882,782 A | * | 3/1999 | Tsubone .................. 428/317.1 |
| 6,497,838 B2 | * | 12/2002 | Usui et al. .................. 264/512 |

FOREIGN PATENT DOCUMENTS

| | | |
|---|---|---|
| EP | 1075921 A2 | 2/2001 |
| GB | 2 110 215 A | 6/1983 |
| JP | 60-110437 | 6/1985 |
| JP | 10-130412 | 5/1998 |
| JP | 10130412 * | 5/1998 |
| JP | 11245928 A | 9/1998 |
| JP | 11-245928 | 9/1999 |

* cited by examiner

Primary Examiner—Catherine A. Simone
(74) Attorney, Agent, or Firm—Fitch, Even, Tabin & Flannery

(57) ABSTRACT

The present invention provides a thermoplastic resin sheet having a thermoplastic resin expanded layer of which expansion ratio is in the range of 3 to 40 times, and cell wall density ratio is in the range of 2 to 20, said thermoplastic resin sheet having excellent thermal insulation property, and a container being formed from the thermoplastic resin sheet.

11 Claims, 2 Drawing Sheets

THERMOPLASTIC RESIN SHEET AND CONTAINER

BACKGROUND OF THE INVENTION

1. Field of the Invention

The present invention relates to a thermoplastic resin sheet having excellent thermal insulation property and a container being formed from the thermoplastic resin sheet.

2. Description of the Prior Art

Resin expanded materials are widely used as building/civil engineering materials, parts of air conditioning equipment, parts of refrigerating/freezing equipment, vehicle/marine vessel materials, container packaging materials and the like while making the most of their excellent thermal insulation property.

Furthermore, in order to improve the thermal insulation property of resin expanded materials, researches for improving cell structures of resin expanded materials have been made. For example, in Japanese Unexamined Patent Publication JP 11-245928-A (1999), it is reported that by making the maximum diameter dimension of cells in a polypropylene-based resin expanded sheet 500 $\mu$m or less, the shape of cells is made roughly spherical, and further by setting the number of cells having roughly spherical shape within the range of 50% or more of the total number of cells for a unit area of the expanded sheet, it is possible to secure appropriate thermal insulation property for a food container obtained by forming the expanded sheet.

However, merely reducing the maximum diameter dimension can improve the thermal insulation property of the resin expanded materials within some restraint, so that it is difficult to obtain sufficient thermal insulation property.

SUMMARY OF THE INVENTION

In view of the above-described problem of the prior art, it is an object of the invention to provide a thermoplastic resin sheet having more excellent thermal insulation property and a container formed from the thermoplastic resin sheet.

The inventors of the present invention found that the above mentioned object can be achieved by providing a thermoplastic resin expanded layer having an inventive cell structure in the thermoplastic resin sheet, and reached the present invention.

To be more specific, the present invention provides a thermoplastic resin sheet having a thermoplastic resin expanded layer of which expansion ratio is in the range of 3 to 40 times, and cell wall density ratio is in the range of 2 to 20.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

DETAILED DESCRIPTION OF THE INVENTION

Figure 1:
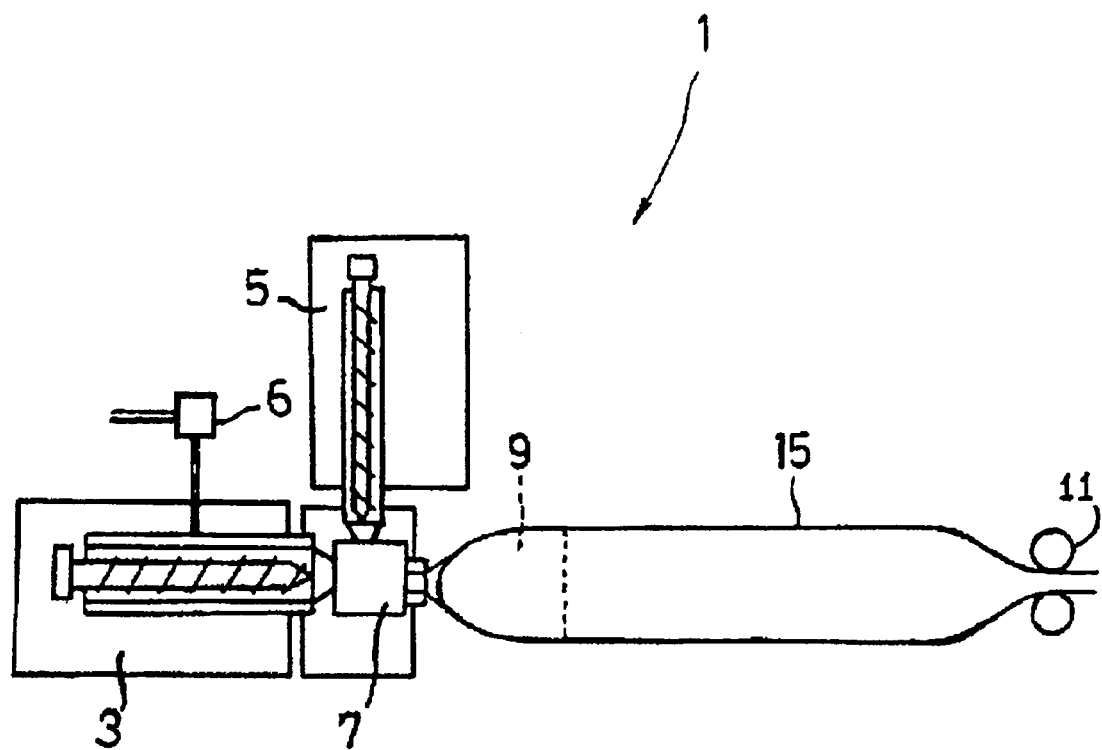
FIG. 1 is a model view showing a preferred embodiment of an apparatus for producing a thermoplastic resin sheet.

A thermoplastic resin sheet of the present invention is characterized by expansion ratio of an expanded layer and cell wall density ratio of the expanded layer, and the thermoplastic resin sheet of the present invention is characterized by having a thermoplastic resin expanded layer of which expansion ratio is in the range of 3 to 40 times, and cell wall density ratio is in the range of 2 to 20.

In the thermoplastic resin expanded layer, heat is more likely to transfer in resin part having high thermal conductivity, while heat is less likely to transfer in celler part having low thermal conductivity. Accordingly, from the view point of the thermal insulation property, the higher the expansion ratio of the expanded layer is, the more it is preferred. However, when an attempt is made to form an expanded layer having an expansion ratio of more than 40 times, cell collapse is likely to occur in the course of the formation, so that usually it is difficult to form an expanded layer of which expansion ratio is more than 40 times. For this reason, in the present invention, the expansion ratio of the expanded layer is set in the range of 3 to 40 times. Preferably, the expansion ratio of the expanded layer is in the range of 3 to 10 times. If the expansion ratio of the expanded layer is less than 3 times, the thermal insulation property of the thermoplastic resin expanded sheet becomes insufficient. The expansion ratio of the expanded layer is adjustable by adjusting the adding amount of the expanding agent to be used and physical conditions in the forming process.

Furthermore, in the present invention, cell wall density ratio of an expanded layer is defined by the following expression:

$$\text{Cell wall density ratio } r = T/S$$

wherein "T" denotes a cell wall density in the direction of thickness of the expanded layer, and "S" denotes a minimum value of the cell wall density in the direction perpendicular to the direction of thickness of the expanded layer.

In the present invention, cell wall density of an expanded layer is defined by the following manner.

In the following, explanation will be made by taking cell wall density in the direction of thickness of the expanded layer as an example.

First, one cross section in the direction of thickness of the expanded layer is enlarged to a magnitude that allows clear recognition of each cell portion with the use of a scanning electron microscope (SEM). Then, on the enlarged image, the number of cell walls with which one straight line in the direction of thickness of the expanded layer intersects (i.e., walls of resin defining cells) is counted. On the basis of the result, the number of cell walls existing in a length of 1 mm in the direction of thickness of the expanded layer is determined. With such a method, the number of cell walls existing in a length of 1 mm in the direction of thickness of the expanded layer is determined for each of the total of 20 or more portions which are distance from each other at intervals of 1 mm or more. The average value of the cell wall numbers is defined as a cell wall density in the direction of thickness of the expanded layer.

The cell wall density of the direction other than the direction of thickness of the expanded layer is also defined in the same manner as the above.

In the thermoplastic resin sheet having a thermoplastic resin expanded layer of which expansion ratio is in the range of 3 to 40 times, the cell wall density ratio of the expanded layer is in the range of 2 to 20. By setting the cell wall density ratio within this range, the expanded layer becomes excellent in compressive strength and the sheet becomes excellent in thermal insulation property. If the cell wall density ratio is larger than 20, the compressive strength of the expanded layer becomes insufficient so that the expanded layer is likely to collapse.

If the cell wall density ratio is less than 2, the heat flow transferring in the direction of thickness of the expanded layer is large, so that the thermal insulation property in the direction of thickness becomes insufficient.

Preferably, the cell wall density ratio is in the range of 6 to 20.

Furthermore, it is preferable that the cell wall density in the direction of thickness of the expanded layer is 8 cells/mm or more.

By setting at the same time the cell wall density in the direction of thickness of the expanded layer and the cell wall density ratio of the expanded layer within the above-mentioned ranges, it is possible to obtain a sheet having more excellent thermal insulation property.

For achieving further excellent thermal insulation property, the cell wall density in the direction of thickness of the expanded layer is preferably 10 cells/mm or more, more preferably 15 cells/mm or more, and still more preferably 20 cells/mm or more. From the view point of thermal insulation property, higher cell wall density in the direction of thickness of the expanded layer is preferable, and there is no upper limitation. However, since formation of expanded layers having cell wall densities of more than 10,000 cells/mm is generally difficult by the current technique, the cell wall density in the direction of thickness of the expanded wall is less than 10,000 cells/mm.

It is preferable that cells of the expanded layer have a shape which is thin in the direction of thickness of the expanded layer and long in the direction perpendicular to the direction of thickness of the expanded layer from the view point of thermal insulation property. Furthermore, cells having a projected shape in the direction of thickness of the expanded layer of a disc shape which is close to a circular shape is more preferred than cells of a bar shape which is long in the direction perpendicular to the direction of thickness of the expanded layer. Overlapping of the disc-like cells in the direction of thickness of the expanded layer makes it possible to efficiently insulate the heat flow in the direction of thickness, so that excellent thermal insulation property is expressed.

In the expanded layer of the thermoplastic resin sheet of the present invention, it is preferable that average cell diameter is in the range of 1 $\mu$m to 100 $\mu$m. When the average cell diameter is within this range, thermal conduction due to the convection of the gas within the cells is efficiently suppressed, so that the thermoplastic resin sheet is excellent in thermal insulation property.

In the present invention, the average cell diameter of the expanded layer is defined and determined in the following manner.

First, a section of the expanded layer along the direction where the cell wall density is the smallest among the directions perpendicular to the direction of thickness of the expanded layer is enlarged and observed by means of a SEM. 20 or more cells from cells observed in the vision are measured for the respective maximum lengths, and the average value thereof is defined as an average max-length L of the cells of the expanded layer.

"d" defined by the following expression is an average cell diameter of the expanded layer in the present invention.

$$d=L/r.$$

(wherein "L" is average max-length of the cells of the expanded layer and "r" is cell wall density ratio of the expanded layer.)

The content of hydrocarbons having 3 to 4 carbon atoms in the expanded layer is preferably 10,000 ppm or less, more preferably 1,000 ppm or less, and most preferably 100 ppm or less.

The thermoplastic resin constituting the expanded layer is not especially limited so far as it can form and maintain the above-mentioned cell structure, and includes polyolefin-based resins such as homopolymers of olefin having 2 to 6 carbon atoms such as ethylene, propylene, butene, pentene, hexene, and olefin copolymers consisting of two or more monomers selected from olefins having 2 to 10 carbon atoms. The copolymers may be any one of block copolymer, random copolymer and graft copolymer. These polyolefin-based resins may consist of a single resin or a blend of two or more resins. From the view point of the thermal resistance, propylene-based resins are preferred, and for improving the formability, it is preferred that a small amount of polyethylene is mixed with the polypropylene-based resins. Furthermore, insofar as the effect of the present invention is not prevented, polymeric compounds other than polyolefin-based resins may be blended.

Particularly preferred polypropylene-based resins include a homopolymer of propylene and a propylene-based copolymer containing 50% by mol or more of propylene units. Preferred examples of copolymer component to be used with propylene in the propylene-based copolymer include ethylene and $\alpha$-olefins having 4 to 10 carbon atoms. The $\alpha$-olefins having 4 to 10 carbon atoms include, for example, 1-buthene, 4-methylpentene-1,1-hexene, and 1-octene. It is preferable that the content of monomer units other than propylene-based in the propylene copolymer is 10% by weight or less for ethylene, and 30% by weight or less for $\alpha$-olefins.

Among polypropylene-based resins, from the reason that formation of an expanded layer having cell structure of high uniformity is possible, (a) polypropylenes having long chain branch and (b) polypropylenes wherein crystalline polypropylene having an intrinsic viscosity of 5 dl/g or more is synthesized in the first step, and crystalline polypropylene having an intrinsic viscosity of less than 3 dl/g is continuously synthesized in the second step, the polypropylenes containing 0.05 to 25% by weight of polypropylene synthesized in the first step and having as the whole an intrinsic viscosity of less than 3 dl/g and a Mw/Mn of less than 10 are preferred.

The thermoplastic resin sheet of the present invention may be of a single-layer structure consisting of the above-mentioned expanded layer and of a multi-layer structure consisting of the above-mentioned expanded layer and other layers insofar as the thermal insulation property thereof is not significantly deteriorated. As the thermoplastic resin sheet of the present invention, the one having at least one expanded layer as described above and at least one thermoplastic resin unexpanided layer laminated thereon is preferred, with the one having a three-layer structure of unexpanded layer/expanded layer/unexpanded layer, or the one having a five-layer structure of unexpanded layer/expanded layer/unexpanded layer/expanded layer/unexpanded being more preferred. In the present invention, the above-mentioned unexpanded layer means the layer having an expansion ratio in the range of 1.0 to 1.5 times, preferably in the range of 1.0 to 1.1 times. In the above-described sheets having the three-layer structure and the five layer structure, since an opening of a cell which opens to the surface of the expanded layer is covered with the unexpanded layer, the heat flow between the outside air and the interior of the expanded layer is reduced and thus excellent thermal insulation property is obtained.

In the case where the thermoplastic resin sheet of the present invention has an unexpanded layer, the thermoplastic resin constituting the unexpanded layer is not particularly limited insofar as the thermal insulation property of the sheet is significantly deteriorated, and includes polyolefin-based resins such as homopolymers of olefin having 2 to 6 carbon atoms such as ethylene, propylene, butene, pentene, hexene, and olefin copolymers consisting of two or more monomers selected from olefins having 2 to 10 carbon atoms. The copolymers may be any one of block copolymer, random copolymer and graft copolymer. These polyolefin-based resins may consist of a single resin or a blend of two or more resins. As the polyolefin-based resin for the unexpanded layer, polyolefin resins having long chain branch are preferred, and polypropylene having long chain branch is particularly preferred.

As the polyolefin-based resin constituting the unexpanded layer, long chain branched polyolefin reins having a branching degree index [A] which satisfies the relationship $0.20 \leq [A] \leq 0.98$ are particularly preferred. Long chain branched polyolefin-based resins having a branching degree index [A] which satisfies the relationship $0.20 \leq [A] 0.98$ exhibit high strength in the molten state, and by providing such a unexpanded layer as a surface layer of the thermoplastic resin sheet of the present invention, it is possible to prevent occurrences of bumps and dips due to collapse of cells, particularly due to collapse of cells in the vicinity of the surface of the expanded layer. As a result of this, it is possible to suppress diffusion of heat toward the direction of thickness of the sheet, and hence a thermoplastic resin sheet having excellent thermal insulation property is obtained. Examples of such preferred polyolefin-based resins include commercially available polypropylene PF-814 manufactured by MONTELL.

Inc addition, branching degree index represents a degree of branching of long chain and is a numerical value as defined by the following expression.

Branching degree index $[A]=[\eta]_{Br}/[\eta]_{Lin}$

In this expression, $[\eta]_{Br}$ represents intrinsic viscosity of a polyolefin-based resin having long chain branch and $[\eta]_{Lin}$ represents intrinsic viscosity of a straight chain polyolefin having the same repeat unit and weight-average molecular weight as the polyolefin-based resin having long chain branch.

Intrinsic viscosity is also referred to as limiting viscosity number and is a yardstick of ability of the polymer molecule to strengthen the solution viscosity. Intrinsic viscosity particularly depends on molecular weight and branching degree of the polymer molecule. Therefore, when a polymer having long chain branch is compared with a straight chain polymer having the same weight-average molecular weight, the intrinsic viscosity represents a yardstick of the branching degree of the polymer, and thus the ratio of these intrinsic viscosities is defined as a branching degree index. A method for measuring intrinsic viscosity of polypropylene is describe by Elliott et al. [J. Appl. Poly. Sci., 14, 2947–2963 (1970)]. Intrinsic viscosity of polypropylene can be measured, for example, at 135 ° C. for a sample in which the polypropylene is dissolved in tetralin or ortho-dichlorobenzene. While weight-average molecular weight (Mw) can be measured by various methods, the method disclosed in American Laboratory, May, 63–75 (1978) by M. L. McConnel, that is, the low angle laser light scattering intensity measuring method is preferably used.

While any expanding agents used for forming the expanded layer are acceptable insofar as they can form the expanded layer satisfying the above-mentioned conditions, inactive substances such as water and carbon dioxide are preferably used. In the case where a polypropylene-based resin is used as a resin constituting the expanded layer, in particular, carbon dioxide is preferably used. The amount of addition thereof is preferably in the range of 0.5 part by weight to 8 parts by weight with respect to 100 parts by weight of the resin constituting the expanded layer. Furthermore, as a nuclear agent, citrate nuclear agents may be added in the range of 0.1 part by weight to 0.5 part by weight with respect to 100 parts by weight of the resin constituting the expanded layer.

The thickness of the expanded layer is preferably 0.2 mm or more for achieving sufficient thermal insulation property, and from the view point of the thermal insulation property, the thicker the expanded layer is, the more the expanded layer is preferred. In the thermoplastic resin sheet having a unexpanded layer at least as a surface, the thickness of the unexpanded layer is not particularly limited insofar as the smoothness of the surface or the appearance is satisfactory, and appropriately determined depending on the application of the sheet, however, the thickness is preferably 1 $\mu$m or more, more preferably 10 $\mu$m or more, and still preferably 50 $\mu$m or more. Too large thickness of the unexpanded layer is not preferable because the lightness of the thermoplastic resin sheet will be deteriorated.

The thermoplastic resin sheet of the present invention may contain additives as appropriate. Examples of such additives include an antioxidant, a light stabilizer, an ultra-violet absorber, an anti-fog agent, an anti-fog agent, a plasticizer, an antistatic agent, a lubricant, a coloring agent and the like. These additives may be blended within the range that does not inhibit the operation and effect of the present invention.

Examples of antioxidant include phenol antioxidants such as 2,5-di-t-butylhydroquinone, 2,6-di-t-butyl-p-ccresol, 4,4'-thiobis-(6-t-butylphenol), 2,2'-methylene-bis(4-methyl-6-t-butylphenol), octadecyl-3 -(3',5'-di-t -butyl-4'-hydroxyphenyl)propionate, 4,4'-thiobis-(6-t-butylphenol), and phosphorus antioxidants such as phenyldiisodecyl phosphate, diphenylisooctyl phosphate, triphenyl phosphate, trinonylphenyl phosphate, tris-(2,4-di-t-butylphenyl) phosphate, 4,4'-isopropylidenediphenolalkyl phosphate, 1,1, 3-tris(2-metyl-4-cdi-tridecyl) phosphate, 6-t-butylphenylbuthanephenyldi(tridecy1) phosphate, and sulfur antioxidants such as dilauryl 3,3'-thiodipropionate, didodecyl 3,3'-thiodipropionate, dimiristyl 3,3'-thiodipropionate, distearyl 3,3'-thiodipropionate, lauryl-stearyl 3,3'-thiodipropionate, bis [2-metyl-4-(3-n-alkylthiopropionyloxy-5-t-b utylphenyl)sulfide, pentaerithritoltetra($\beta$-lauryl-thiopropionate)ester, 2-mercaptobenzimidazole, 2-mercapto-6-metylbenzimidazole.

The thermoplastic resin sheet having a unexpanded layer of the present invention may contain inorganic fillers in the unexpanded layer for improving the stiffness.

Examples of such inorganic fillers to be used for this purpose include silicon oxide, aluminum oxide, titanium oxide, magnesium oxide, aluminum hydroxide, magnesium hydroxide, calcium carbonate, magnesium carbonate, calcium sulfate, barium sulfate, magnesium sulfate, talk, clay, mica and the like, and talk is particularly preferred.

The amount is preferably in the range of 5 parts by weight to 150 parts by weight with respect to 100 parts by weight of a resin constituting the unexpanded layer. If the inorganic filler is less than 5 parts by weight, the stiffness will not be improved sufficiently, while if the inorganic filler is more than 150 parts by weight, smoothness of a surface of the sheet will be deteriorate in the case of a thermoplastic resin sheet having a surface of an unexpanded layer.

As the method for producing the thermoplastic resin sheet of the present invention, the method which comprises the steps of: extruding a molten resin from a die such as flat die (such as T die or coat hunger die), straight die, circular die (such as crosshead die); compressing the resin by, for example, a specified roll pressure (line pressure) while causing the resin to expand at the same time; and then performing drawing may be preferably used. Also, the method in which after a molten resin is extruded from a die as described above, and then the resin is expanded, the resin is compressed, for example, by a specified roll pressure (line pressure) and then drawing operation is made by the use of a tenter drawing machine may be preferred.

In the above, it is desired that the specific roll pressure (line pressure) is in the range of about 6 to 10 kg fcm, for example, and by applying such a roll pressure on the extruded and expanded resin, it is possible to form a thermoplastic resin expanded layer having a specific cell structure. As a method for applying the specified roll pressure on an extruded and expanded resin, for example, a method utilizing two winding rolls (nip rolls) may be used.

As a method for drawing the sheet-like resin, (1) a method for drawing the extruded resin with the use of a tenter drawing machine and the like, (2) a method for pulling out the extruded resin along an internal mandrel, and (3) a method for expanding the resin extruded from a circular die by air blow may be used. In the method for drawing with the use of a tenter drawing machine, it is desired that the extruded and expanded resin is heated to about 130 to 170° C., and the resin is drawn in its TD direction to 2 to 10 times. The aperture of the circular die is preferably 50 mm$\phi$ or more, and more preferably 80 mmy or more.

In the case of drawing the resin having been extruded from the circular die, the draw ratio is preferably 10 times or less, more preferably in the range of 2.5 times to 10 times, and still preferably in the range of 5 times to 10 times. If the draw ratio is less than 2 times, wrinkles are likely to occur on the surface of the sheet-like resin, while on the other hand, if the draw ratio is more than 10 times, the sheet-like resin is likely to be get torn at the time of drawing.

In the above, draw ratio means a ratio of an inner diameter of a sheet-like resin after expansion by drawing along the internal mandrel or by air blowing, with respect to the aperture of the circular dies.

For producing a thermoplastic resin sheet having an expansion ratio in the range of 3 to 40 times, the amount of expanding agent is appropriately adjusted so that a desired expansion ratio is obtained. Furthermore, the cell wall density and average cell diameter of the expanded layer may be adjusted by selecting a thermoplastic resin having an appropriate melt viscosity as the resin for the expanded layer.

One example of the method for producing the thermoplastic resin sheet of the present invention will be explained with reference to the drawings. In this example, a polypropylene sheet having a three-layer structure of unexpanded layer/expanded layer/unexpanded layer is produced by using polypropylene as the expanded layers, polypropylene having long chain branch as the unexpanded layer and carbon dioxide as the expanding agent.

FIG. 1 shows one example of a producing apparatus for producing the thermoplastic resin sheet of the present invention. A producing apparatus 1 comprises an extruder 3 for extruding a material for constituting an expanded layer, an extruder 6 for extruding a material for constituting an unexpanded layer, a die 7, a mandrel 9 and a winding roll (nip roll) 11.

The extruder 3 is provided with a pump 6 for supplying carbon oxide which is an expanding agent. Polypropylene introduced into a cylinder of the extruder 3 from a hopper is melted while being conveyed toward the direction of the die 7 by means of a screw. The carbon oxide is supplied to the molten resin at the point that the resin has sufficiently melted and then diffused uniformly. The polypropylene thus containing the expanding agent is introduced into the die 7. An embodiment using a known bent-type extruder and pressure-supplying carbon oxide from the bent hole is preferable.

Long chain branched polypropylene for constituting unexpanded layers is melted by the extruder 5 and introduced into the die 7. The die 7 is not particularly limited as to its type insofar as it has an internal structure suitable for formation of multi-layer sheet, and examples thereof include flat die (such as T die and coat hunger die), straight die, circular die (such as crosshead die) and the like.

The material for constituting an expanded layer and the material for constituting an unexpanded layer are extruded while being laminated in the molten state within the die 7, and the retention time within the extrusion die 7 after lamination is preferably 0.1 to 20 seconds, and more preferably 0.5 to 15 seconds.

The three-layer expanded sheet send out in the form of a tube from the die 7 is formed into a tube 15 having a predetermined diameter by the mandrel 9, and after cooling, the sheet is drawn out with being folded by the winding roll (nip roll) 11. Opening the sheet by cutting at the both folded portions results in two sheets of a three-layer structure. On the other hand, opening the sheet by cutting at one of the folded portions results in one wide sheet having a three-layer structure.

Bonding two obtained sheets having a three-layer structure results in a sheet having a five-layer structure of unexpanded layer/expanded layer/unexpanded layer/ expanded layer/unexpanded layer. Further lamination may be made to obtain multi-layer structures.

Figure 2:
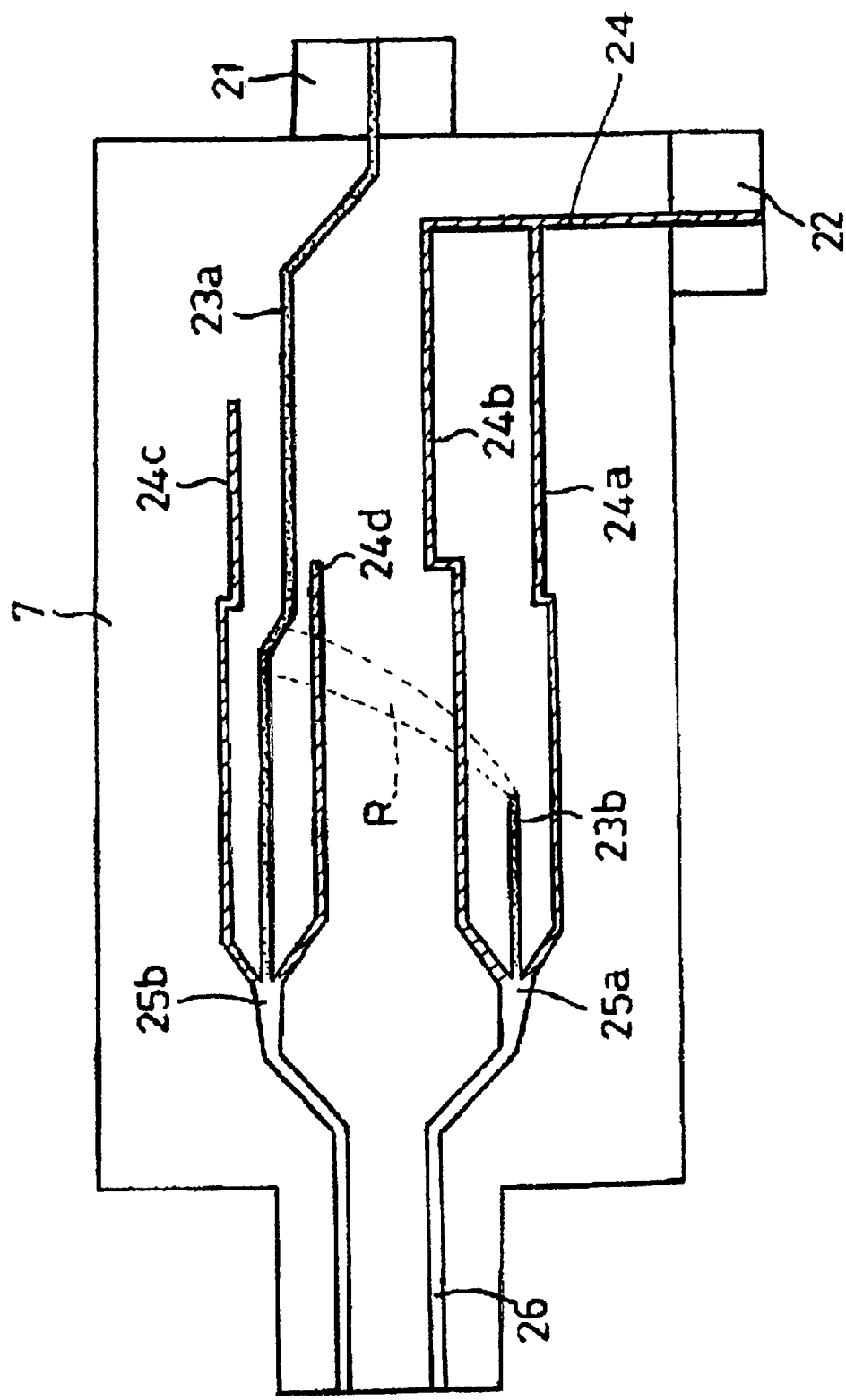
FIG. 2 is a section view exemplifying a preferred embodiment of a head in the apparatus for producing a thermoplastic resin sheet.

A preferred embodiment of the structure of the die is shown in section in FIG. 2.

The die used in this example is a circular die. The die 7 is formed with passages 23*a*, 23*b* for the resin for constituting the expanded layer, and passages 24*a*, 24*b*, 24*c*, 24*d* for the resin for constituting the unexpanded layers.

At a source side end portion in the pass direction of the resin of the die 7 is connected a head 21 of the extruder 3, and at a source side portion is connected a head 22 of the extruder 5. The molten resin for constituting the expanded layer supplied from the head 21 first enters the passage 23*a* to be sent toward the outlet of the die. In the course of this, the resin passes a pass P to be branched and sent to the passage 23*b*.

On the other hand, the molten resin for constituting the unexpanded layers is supplied from the head 22 of the extruder 5, separated into 24a, 24b by the passage 24, supplied so that they adheres on the both sides of the passage 23 so as to cover the both sides of the expanded layer, and laminated at 25a. The molten resin supplied to the passages 24c, 24d is supplied via a separating passage (not shown) similar to the pass P so as to cover the both sides of the expanded layer of the passage 23a, and then laminated at 25b.

The molten resins thus formed into a cylindrical shape having a three-layer structure at 25a, 25b are extruded from the die outlet 26. This releasing to the atmospheric pressure, the carbon dioxide in the resin constituting the expanded layer expands to generate cells and an expanded layer is formed.

In production of the thermoplastic resin sheet of the present invention, discharge of molten resin (Q: kg/h·mm) and aperture of the die 7 (D: mm$\phi$) preferably have the relationship of $Q/D \geqq 0.3$ kg/h·mm, and more preferably have the relationship of $Q/D \geqq 0.6$ kg/h·mm.

Lip clearance of the die outlet 26 is preferably 0.5 to 3 mm, and more preferably 1 to 2 mm.

Taper angel of the die outlet is preferably 0° to 5°, and more preferably 0° to 1°.

Taper land length is preferably 10 mm or less, and more preferably 5 mm or less.

The angle formed by the core center of the die and the taper land of the die outlet is preferably 450° to 800°, and more preferably 500° to 700°.

In order to improve the expansion ratio, it is preferable that the sheet extruded from the die is caused to pass thorough a vacuum chamber. The expanded layer further expands within the vacuum chamber, so that a thermoplastic resin sheet having an expanded layer of high expansion ratio can be obtained.

While in the above examples, the case using a single-screw extruder is exemplified, a two-screw extruder and the like may be used. In particular, use of a two-screw extruder as the extruder for extruding the material constituting the expanded layer is preferred.

Thermoplastic resin sheets having an expanded layer of still larger cell wall density ratio may be produced by the method of further drawing the thermoplastic resin sheet (hereinafter, referred to as an expanded sheet) having an expanded layer which is obtained by expansion under the drawing condition. It is preferred that this additional drawing is carried out after preheating the expanded sheet.

As the method for drawing the expanded sheet, there may be exemplified common drawing methods, for example, uniaxial drawing, zone drawing, flat successive drawing, flat simultaneous drawing, tubular simultaneous drawing. For improving the thermal insulation property of the expanded sheet in its entirety, it is preferred that the drawing is executed by simultaneous biaxial drawing.

The thermoplastic resin sheet of the present invention may have another layer (hereinafter, referred to as an additional layer) other than said unexpanded layer laminated on said expanded layer insofar as thermal insulation property is not deteriorated. By provided such an additional layer, it is possible to improve the mechanical properties such as flexural rigidity, compressive strength, surface scratch-less property and dimensional stability, and the functionalities such as thermal resistance, thermal insulation property, gas-barrier property, formability and dimensional stability, as well as it is possible to present the thermoplastic resin sheet of the present invention with the properties such as gloss, surface smoothness and appearance beauty. As an additional layer, there may be exemplified layers formed of woven cloth, unwoven cloth, knitted cloth, sheet, film, mesh material and the like. The thermoplastic resin sheet of to the present invention may have an adhesive layer or a layer of adhesive resin for bonding each layer.

Materials for the additional layer may be appropriately selected depending on its purpose, and examples thereof include thermoplastic resins, thermosetting resins, rubbers, thermoplastic elastomers, natural fibers such as hemp and minerals such as calcium silicate. Also timber, paper, synthetic paper formed of polypropylene or polystyrene, metal sheet metal or metallic foil of aluminum or iron and the like can be used. Such an additional layer may have convexo concave patterns such as texture, or printing and dyeing may be carried out on the additionally layer. Such an additional layer may be of a single-layer structure or a multi-layer structure consisting of 2 or more layers. The additional layer may be a surface layer or an internal layer of the thermoplastic resin sheet of the present invention.

Examples of thermoplastic resin constituting such an additional layer include polyolefin-based reins, ethylene-vinyl ester copolymer, polyester-based resins, polyamide-based resins and the like.

In the case where the thermoplastic resin sheet of the present invention is applied for a food container, it is preferable that the sheet has an unoriented polypropylene film (CPP), an oriented polypropylene film (OPP), an ethylene-vinyl ester copolymer film and the like as the additional layer.

The above-mentioned additional layer may be formed with the use of a method for bonding a sheet (or film) corresponding to that layer to said expanded layer or unexpanded layer via an adhesive layer, or a method for welding the additional layer on the expanded layer or unexpanded layer.

As the method for bonding with an adhesive layer, a method in which an adhesive agent is applied to a sheet (or film) to become an additional layer, and/or, the expanded layer or the unexpanded layer is exemplified. Also a method such that a sheet (or film) in which an adhesive resin sheet (or film) is laminated on a sheet (or film) to become an additional layer is used, and the sheet (or film) is adhered to the expanded layer or the unexpanded layer by heating and melting the adhesive resin is possible. Furthermore, contrarily to the above, it is also possible to previously laminate an adhesive resin sheet (or film) on the expanded layer or the unexpanded layer, and make the lamination to adhere with a sheet (film) to become an additional layer by heat melting.

As the method for forming an additional layer on the expanded layer of the unexpanded layer by welding, for example, a forming method according to lamination by extruding an additional layer on the expanded layer or the unexpanded layer, and a method for bonding by heat melting at least one of surfaces of a sheet to become an additional sheet and the expanded layer (and/or unexpanded layer) to which the additional sheet is to be bonded are exemplified.

As the method of forming the thermoplastic resin sheet of the present invention, a method comprising the steps of heating the thermoplastic resin sheet with an infrared heater and the like to soften the same, forming the sheet by means of the methods such as vacuum forming, pressure forming and vacuum pressure forming with the use of molds such as male mold member, female mold member, a pair of male and female mold members, and solidifying the resulting sheet by cooling and a method for forming by pressing by supplying the thermoplastic resin sheet of the present invention between two fittable mold members without using the vacuum and pressure forming techniques are exemplified.

The thermoplastic resin sheet of the present invention is excellent in thermal insulation property because of having the expanded layer of a specific cell structure, and it is possible to obtain a container having excellent thermal insulation property by forming this sheet.

EXAMPLES

In the following, examples and the like specifically showing the technical futures and effects of the present invention will be explained.

Example 1

Following the method as will be described below, a thermoplastic resin sheet consisting of three layers of unexpanded layer/expanded layer/unexpanded layer was produced, and after preheated at 140° C. for 3 minutes, the sheet was subjected to simultaneous biaxial drawing by means of a tabletop biaxial drawing machine (manufactured by Toyo Seiki Seisaku-Sho, Ltd.) at a drawing speed of 30 mm/sec. and drawn by twice in the MD direction and twice in the TD direction.

The physical properties of the resulting expanded sheet were evaluated. The results are shown in Table 1.
(Material for Constituting an Expanded Layer)

As the material constituting an expanded layer, a mixture in which polypropylene and polyethylene are pellet-blended at a weight ratio of 70:30 by two-stage polymerization was used. The polymerization method will be described below.
(1) Synthesis of Solid Catalyst After replacement of a 200 L stainless reaction vessel equipped with a stirrer with nitrogen, 80 L of hexane, 6.55 mol of titanium tetrabutoxide, 2.8 mol of diisobutyl phthalate and 98.9 mol of tetraethoxysilane were introduced to make a uniform solution. Next, 51 L of a butylmagnecium chloride solution in diisobutylether having a concentration of 2.1 mol/L was gradually dropped for 5 hours while keeping the internal temperature of the reaction vessel at 5° C. After completion of the dropping, the solution was stirred for another one hour at room temperature and separated into solid and liquid phases at room temperature, and washing with 70 L of toluene was repeated for 3 times. Next, after adding toluene so that the slurry concentration becomes 0.6 kg/L, a mixed solution of 8.9 mol of n-butylether and 274 mol of titanium tetrachloride was added, and after that, 20.8 mol of phthalic acid chloride was added and the resultant mixture was allowed to react for 3 hours at 110° C. After completion of the reaction, washing at 95° C. with toluene was carried out twice. Next, after adjusting the slurry concentration to 0.6 kg/L, 3.13 mol of diisobutyl phthalate, 8.9 mol of dibutylether and 137 mol of titanium tetrachloride we added, and the resultant mixture was allowed to react for 1 hour at 105° C. After completion of the reaction, solid-liquid separation was made at the same temperature, washing at 95° C. with 90 L of toluene was carried out twice. Next, after adjusting the slurry concentration to 0.6 kg/L, 8.9 mol of dibutylether and 137 mol of titanium tetrachloride we added, and the resultant mixture was allowed to react for 1 hour at 95 ° C. After completion of the reaction, solid-liquid separation was made at the same temperature, washing with 90 L of toluene was carried out three times at the same temperature. Next, after adjusting the slurry concentration to 0.6 kg/L, 8.9 mol of dibutylether and 137 mol of titanium tetrachloride we added, and the resultant mixture was allowed to react for 1 hour at 95° C. After completion of the reaction, solid-liquid separation was made at the same temperature, washing with 90 L of toluene was carried out three times at the same temperature, and after carrying out washing with 90 L of hexane for three times, the resultant mixture was dried in vacuo to obtain 11.0 kg of solid catalyst component.

The solid catalyst component contained 1.9% by weight of titanium atoms, 20% by weight of magnesium atoms, 8.6% by weight of phthalic acid ester, 0.05% by weight of ethoxy groups and 0.21% by weight of buthoxy groups, and had an excellent particulate shape with no fine powder.
(2) Pre-activation of Solid Catalyst Component 1.5 L of n-hexane, 37.6 mmol of triethylaluminum, 3.75 mmol of t-butyl-n-propyldimethoxysilane and 15 g of the above solid catalyst component that were sufficiently dehydrated and degassed were added to a 3 L stainless autoclave equipped with a stirrer, and 15 g of propylene was successively supplied for 30 minutes while keeping the internal temperature at 5 to 15 ° C., thereby accomplishing pre-activation.
(3) Polymerization of Propylene Copolymer First Stage In a 300 L stainless polymerization vessel, by continuously supplying 1.3 mmol/h of trietylaluminum, 0.13 mmol/h of t-butyl-n-propyldimethoxysilane and 0.51 g/h of the pre-activated solid catalyst component while continuously supplying liquid propylene at a rate of 57 kg/h so as to keep the polymerization temperature of 60 ° C. and the polymerization pressure of 27 kg/cm$^2$G, propylene polymerization substantially in the absence of hydrogen was accomplished to obtain 2.0 kg/h of polymer. At this time, the amount of polymer product was 3920 g per 1 g of catalyst, and the limiting viscosity thereof was 7.7 dl/g as a result of sampling of part of the product. The polymer thus obtained was successively transferred to the second vessel without deactivation.

Second Stage

In an i m$^3$ fluidized reactor equipped with a stirrer, propylene polymerization was successively continued by supplying 60 mmol/h of the polymer, which is containing catalyst, transferred from the first vessel and triethylaluminum and 6 mmol/h of t-butyl-n-propyldimethoxysilane while continuously supplying propylene and hydrogen so as to keep the polymerization temperature of 80° C. and the polymerization pressure of 18 kg/cm$^2$G and 8 vol% of hydrogen concentration in gas area, and 18.2 kg/ h of polymer was obtained. The limiting viscosity of this polymer was 1.9 dl/g.

From the above result, it was determined that production amount at the second stage polymerization was 31760 g per 1 g of catalyst, polymerization weight ratio of the first polymerization vessel and the second polymerization vessel was 11/89, and intrinsic viscosity of the polymer part obtained in the second stage polymerization was 1.2 dL/g.
(4) Pelletization of Polymer With respect to 100 parts by weight of powder of polymer obtained by the above-mentioned two-stage reaction, 0.1 part by weight of calcium stearate, 0.05 part by weight of IRGANOX® 1010 (manufactured by Ciba Geigy) and 0.2 part by weight of SUMILIZER® BHT (manufactured by Sumitomo Chemical Co. Ltd.) were added and mixed, and the resultant mixture was melt-kneaded at 230° C. to obtain a pellet having a MFR of 12.
Blend of Material for Constituting an Expanded Layer The polypropylene obtained by the above-described method and a pellet of polyethylene (SUMIKATHENE® G201, manufactured by Sumitomo Chemical Co. Ltd.) were dry-blended in a weight ratio of 70:30.
(Material for Constituting an Unexpanded Layer)

As the material constituting an unexpanded layer, polypropylene PF814 having long chain branch manufactured by MONTELL (melting point: 159.0° C., crystallization temperature: 130.1° C., MI: 2.2g/10 min.) was used.

(Extrusion Expanding)

An apparatus in which 90 mm t circular die (7) was attached to the 50 mmΦ twin screw extruder (3) and the 32 mmΦ single screw extruder (5) was used. A material in which 1 part by weight of nuclear agent (HYDROCEROLL®, manufactured by Boehringer Ingelheim Chemicals. Co. Ltd.) is blended with respect to 100 parts by weight of the 70/30 mixture used for the expanded layer (weight ratio) of the propylene-based copolymer /polyethylene was introduced to the hopper of the extruder (3), 1 part by weigh of carbon dioxide was injected from the point that the melting has proceeded, and the material was sent to the die (7) after being sufficiently melted and kneaded with the carbon dioxide. The above molten mixture to become an expanded layer and the molten resin sent by the extruder (5) to become an unexpanded layer were laminated in the die and extruded, and the extruded material was cooled along the 210 mmΦ mandrel (9) disposed directly after the die, to be elongated to 2.3 times. Then, a slit is made on the cylindrical expanded sheet by means of a cutter, the cylinder is opened to make a flat expanded sheet, and the sheet was wound by the winder (11). Incidentally, the winding roll (nip roll) pressure was about 6.8 kgf/cm.

Example 2

After pre-heating a polypropylene resin expanded sheet (SUMICELLER®3030 manufactured by Sumitomo Chemical Co. Ltd., expansion ratio: 3 times, thickness: 3 mm, winding roll (nip roll) pressure: about 8.2 kgf/cm), the sheet was subjected to simultaneous biaxial drawing by means of a tabletop biaxial drawing machine (manufactured by Toyo Seiki Seisaku-Sho, Ltd.) at a drawing speed of 30 mm/sec. and drawn by twice in the MD direction and twice in the TD direction.

The physical properties of the resulting expanded sheet were evaluated. The results are shown in Table 1.

Comparative Example 1

Physical properties of a commercially available two-layer polypropylene expanded sheet having a thickness of 1.2 mm and an expansion ratio of the expanded layer of 2. 5 times were evaluated. The results are shown in Table 1.

Comparative Example 2

Physical properties of a commercially available polypropylene expanded sheet having a thickness of 3 mm and an expansion ratio of the expanded layer of 3 times were evaluated. The results are shown in Table 1

(Cell Wall Density in the Direction of Thickness of Expanded Layer)

After cooling the expanded sheet by liquid nitrogen, the sheet was cut along the direction of thickness with a razor, and the cross section of the expand sheet was photographed by a scanning electron microscope. Magnitude was adjusted so that each cell existing within the view of the scanning electron microscope can be clearly recognized.

On the enlarged image thus obtained, the number of cell walls with which one straight line in the direction of thickness of the expanded layer intersects was counted. On the basis of the result, the number of cell walls existing in a length of 1 mm in the direction of thickness of the expanded layer was determined. With such a method, the number of cell walls existing in a length of 1 mm in the direction of thickness of the expanded layer was determined for each of the total of 20 or more portions which are distance from each other at intervals of 1 mm or more. By calculating an average value of the cell wall numbers, a cell wall density in the direction of thickness of the expanded layer wad determined.

(Cell Wall Density Ratio)

After cooling the expanded sheet by liquid nitrogen, the expanded sheet was cut along the direction perpendicular to the direction of thickness of the sheet with a razor, and this cross section was photographed by a scanning electron microscope. Magnitude was adjusted so that each cell actually existing within the view of the scanning electron microscope can be recognized with being distinguished from each other.

Cell wall density ratio of the expanded layer was determined according to the following expression.

$$r = T/S$$

wherein "T" denotes a cell wall density in the direction of thickness of the expanded layer, and "S" denotes a minimum value of the cell wall density in the direction perpendicular to the direction of thickness of the expanded layer.

(Average Cell Diameter)

A section of the expanded layer along the direction where the cell wall density is the smallest among the directions perpendicular to the direction of thickness of the expanded layer was observed with being enlarged by means of a scanning electron microscope. 20 or more cells from cells observed in the vision were measured for the respective maximum lengths, and the average value thereof was determined as an average max-length L. Average cell diameter of the expanded layer was determined according to the following expression.

$$d = L/r$$

wherein "L" is average max-length of the cells of the expanded layer and "r" is cell wall density ratio of the expanded layer.

(Thermal Conductivity)

Thermal conductivity was measured according to JIS A1412 with the use of a thermal conductivity measuring apparatus manufactured by Eko Instruments Trading Co. Ltd. (AUTO-A series HC-074). [Low-temperature plate temperature: 20° C., High-temperature plate temperature: 30° C., Temperature Equilirium: 0.2° C., Between Block HEM Equil: 49 μm, HFM Percent Change: 2.0%, Min Number of Block: 4, Calculation Blocks: 3]

The sheet to be measured is of as close to 200 mm x 200 mm as possible, and a single sheet was measured for Examples 1 and 3, Comparative Examples 2 and 4, lamination of three sheets was measured for Example 2, and lamination of two sheets was measured for Comparative Examples 1 and 3.

TABLE 1

| Item | Example 1 | Example 2 | Comparative Example 1 | Comparative Example 2 |
| --- | --- | --- | --- | --- |
| Sheet thickness (mm) | 0.75 | 0.75 | 1.2 | 3 |
| Thickness of unexpanded layer (mm) | 0.03 | 0 | 0.1 | 0 |
| Expansion ratio of unexpanded layer (times) | 1.0 | — | 1.0 | — |
| Expansion ratio of expanded layer (times) | 4 | 3 | 2.5 | 3 |
| Cell wall density ratio in thickness direction (cells/mm) | 18 | 19 | 5 | 5 |
| Cell wall density ratio | 10 | 7 | 2.3 | 1.8 |
| Thermal conductivity (W/m·K) | 0.040 | 0.040 | 0.051 | 0.052 |
| Average cell diameter (μm) | 90 | 90 | 300 | 400 |

Example 3

A thermoplastic resin sheet consisting of three layers of unexpanded layer/expanded layer/unexpanded layer was manufactured in the same method (winding roll (nip roll) pressure: about 6.8 kgf/cm) as shown in Example 1. After pre-heating the sheet at 130° C. for 3 minutes, the sheet was subjected to simultaneous biaxial drawing by means of a tabletop biaxial drawing machine (manufactured by Toyo Seiki Seisaku-Sho, Ltd.) at a drawing speed of 30 mm/sec. and drawn by 2 times in the MD direction and 2 times in the TD direction.

The physical properties thereof were evaluated. The results are shown in Table 2.

Comparative Example 3

Physical properties of a commercially available two-layer polypropylene expanded sheet having a thickness of 1.2 mm and an expansion ratio of the expanded layer of 2.5 times were evaluated. The results are shown in Table 2.

Comparative Example 4

Physical properties of a commercially available polypropylene expanded sheet having a thickness of 3 mm and an expansion ratio of the expanded layer of 3 times were evaluated. The results are shown in Table 2.

TABLE 2

| Item | Example 3 | Comparative Example 3 | Comparative Example 4 |
|---|---|---|---|
| Sheet thickness (mm) | 2.4 | 1.2 | 3 |
| Thickness of unexpanded layer (mm) | 0.1 | 0.1 | 0 |
| Expansion ratio of unexpanded layer (times) | 1.0 | 1.0 | — |
| Expansion ratio of expanded layer (times) | 4 | 2.5 | 3 |
| Cell wall density in thickness direction (cells/mm) | 10 | 5 | 5 |
| Cell wall density ratio | 4 | 2.3 | 1.8 |
| Thermal conductivity (W/m·K) | 0.047 | 0.051 | 0.052 |
| Average cell diameter (μm) | 90 | 300 | 400 |

What is claimed is:

1. A thermoplastic resin sheet having a thermoplastic resin expanded layer of which expansion ratio is in the range of 3 to 40 times, and a cell wall density ratio is in a range of 2 to 20, wherein the cell wall density ratio is defined as being T/S wherein T denotes a cell wall density in the direction of thickness of the expanded layer and S denotes a minimum value of the cell wall density in the direction perpendicular to the direction of thickness of the expanded layer, wherein a cell wall density is defined as being the average number of cell walls existing within a distance of 1 mm in the expanded layer, and wherein the average cell diameter is in the range of 1 μm to 10 μm.

2. A thermoplastic resin sheet having a thermoplastic resin expanded layer of which expansion ratio is in a range of 3 to 40 times, and cell wall density ratio is in a range of 6 to 20, wherein the cell wall density ratio is defined as being T/S wherein T denotes a cell wall density in the direction of thickness of the expanded layer and S denotes a minimum value of the cell wall density in the direction perpendicular to the direction of thickness of the expanded layer, wherein a cell wall density is defined as being the average number of cell walls existing within a distance of 1 mm in the expanded layer, and wherein the average cell diameter is in the range of 1μm to 100μm.

3. A thermoplastic resin sheet having a thermoplastic resin expanded layer of which expansion ratio is in the range of 3 to 40 times, cell wall density across a thickness direction of said thermoplastic sheet is 8 cells/mm or more, and cell wall density ratio is in a range of 6 to 20, wherein the cell wall density ratio is defined as being T/S wherein T denotes a cell wall density in the direction of thickness of the expanded layer and S denotes a minimum value of the cell wall density in the direction perpendicular to the direction of thickness of the expanded layer, wherein a cell wall density is defined as being the average number of cell walls existing within a distance of 1 mm in the expanded layer, and wherein the average cell diameter is in the range of 1μm to 100μm.

4. A thermoplastic resin sheet having a thermoplastic resin expanded layer of which expansion ratio is in the range of 3 to 40 times, cell wall density across a thickness direction of said thermoplastic sheet is 8 cells/mm or more, and cell wall density ratio is not less than 2 but less than 6, wherein the cell wall density ratio is defined as being T/S wherein T denotes a cell wall density in the direction of thickness of the expanded layer and S denotes a minimum value of the cell wall density in the direction perpendicular to the direction of thickness of the expanded layer, wherein a cell wall density is defined as being the average number of cell walls existing within a distance of 1 mm in the expanded layer, and wherein the average cell diameter is in the range of 1μm to 100μm.

5. The thermoplastic resin sheet according to claim 1, wherein the said expanded layer is formed of polypropylene-based resins.

6. The thermoplastic resin sheet according to claim 1, wherein said thermoplastic sheet has a polyolefin-based resin unexpanded layer, that is laminated on said expanded layer and has an expansion ratio in a range of 1.0 to 1.5.

7. The thermoplastic resin sheet according to claim 6, wherein said unexpanded layer is formed of polyolefin-based resins having long chain branch.

8. A container being formed from the thermoplastic resin sheet of claim 1.

9. The thermoplastic resin sheet according to claim 6, wherein said unexpanded layer has an expansion ratio in the range of 1.0 to 1.1.

10. The thermoplastic resin sheet according to claim 6, wherein said unexpanded layer is formed of a polyolefin resin having a branching degree index [A] that is a numerical value defined by:

$$[A]=[\eta]_{Br}/[\eta]_{Lin}$$

wherein $[\eta]_{Br}$ represents the intrinsic viscosity of a polyolefin resin having a long chain branch and $[\eta]_{Lin}$ represents the intrinsic viscosity of a straight chain polyolefin having the repeating monomer units and weight average molecular weight as the polyolefin resin having the long chain branch.

11. The thermoplastic resin sheet according to claim 10, wherein said unexpanded layer is formed of a polyolefin resin having a branching degree index [A], wherein $0.20 \leq [A] \leq 0.98$ is satisfied.

* * * * *